(No Model.)
S. TRUMPY.
WIRE REEL.
No. 459,186. Patented Sept. 8, 1891.
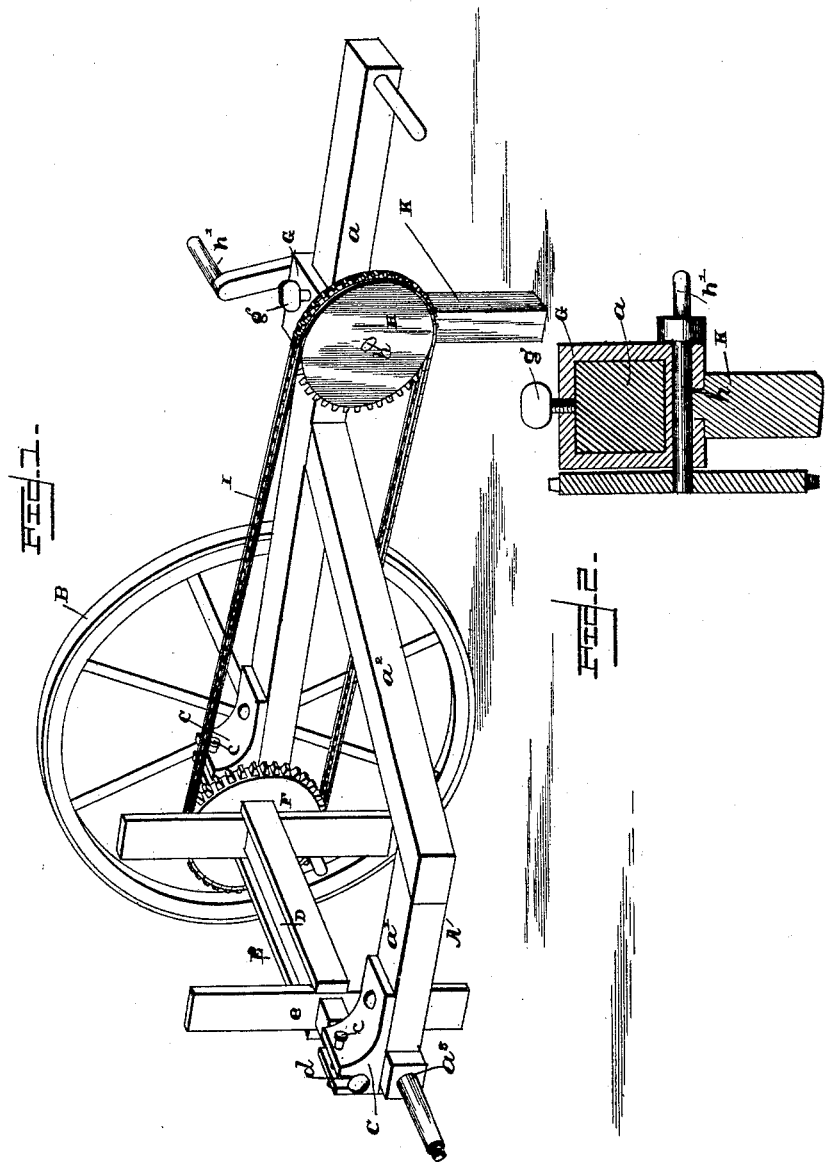
Witnesses
E. S. Duvall, Jr.
J. Edgar Smith
Inventor
Solomon Trumpy.
By his Attorneys,
C. A. Snow & Co.

UNITED STATES PATENT OFFICE.

SOLOMON TRUMPY, OF ROMONA, SOUTH DAKOTA.

WIRE-REEL.

SPECIFICATION forming part of Letters Patent No. 459,186, dated September 8, 1891.

Application filed April 15, 1891. Serial No. 389,061. (No model.)

*To all whom it may concern:*

Be it known that I, SOLOMON TRUMPY, a citizen of the United States, residing at Romona, in the county of Lake and State of South Dakota, have invented a new and useful Wire-Reel, of which the following is a specification.

This invention is an improvement in wire-reels; and it has for its objects to provide a wire-reel by the use of which barbed wire may be wound for transportation either in the first case or after having been once used on a fence; to provide a wire-reel by the use of which wire may be taken from one fence and put in some other place; to provide a wire-reel by the use of which labor may be saved and time and money economized.

The invention has for its further objects the production of a wire-reel which will be compact and simple in construction, inexpensive in manufacture, easy to operate, and durable in use.

With these objects in view the invention resides in the various novel details of construction and in the combination of parts hereinafter fully described, and particularly pointed out in the claims.

In the drawings in which I have illustrated my invention, and in which like letters of reference indicate corresponding parts, Figure 1 is a perspective view of my device; and Fig. 2 is a detail view of one of the parts, showing the same in vertical section.

In the drawings, A designates the frame of my reel-carriage, the same consisting of a draft-pole $a$, the pole $a'$, and the brace-piece $a^2$, connecting the two. Stub-axles $a^3$ extend outwardly from the ends of the two poles $a$ $a'$, and these two stub-axles have journaled on them the wheels B.

C designates journal-boxes, which are secured to the upper sides of the poles $a$ $a'$, and these journal-boxes may have pins $c$ to close the upper portions, as shown, or they may have the ordinary hinged journal-box tops.

D designates the reel-spindle, which has upon its ends the journals $d$ and has its body rectangular in cross-section.

E designates the reel itself, and consists of a frame $e$, having rectangular openings through its center for the purpose of fitting upon the rectangular spindle D.

F designates a sprocket-wheel fast upon the spindle D.

Upon the draft-pole $a$ and movable along the length thereof is a sleeve or collar G. This collar G is provided with a set-screw $g$ for the purpose of securing the collar at any position upon the pole $a$. This collar G carries with it the sprocket-wheel H, which is fast upon a shaft $h$, which has upon its outer end the crank-handle $h'$. A sprocket-chain I connects the sprocket-wheel H with the sprocket-wheel F.

K designates a leg or rest secured to the under portion of the collar G for the purpose of supporting the frame at sufficient height above the ground.

The operation of the device is very simple. In case it is desired to wind wire upon the reel E the collar G is moved along the pole $a$ until the sprocket-chain I, which connects the sprocket-wheel H with the sprocket-wheel F, is sufficiently tight. One end of the wire is now passed around the reel E or is secured in any suitable manner to the frame $e$ thereof. By turning the crank $h'$ the reel is revolved and the wire wound thereon through the sprocket-wheels and sprocket-chain just described. When the wire has been wound upon the reel, the reel with the wire may be removed from the frame by removing the pins $c$ and lifting the reel from the journal-boxes C. If the reel with the wire be too heavy to be lifted from the said journal-boxes, the frame may be upset or turned backward until the reel will drop out of the journal-boxes by gravity; but in case the device is used to lay wire along a fence or along the line of a telegraph or of a telephone connection all that is necessary to do is to place a reel filled with wire upon the spindle D, and fastening one end of the wire to a fence or the like propel the carriage along the line of the fence or of the telegraph-pole. The wire will unwind of itself.

Having thus described my invention, what I claim as new, and desire to secure by Letters Patent, is—

1. In a wire-reel, the combination, with the carriage, the reel, and the reel-spindle having the sprocket-wheels fast upon it, of the collar G, adjustable along the length of the pole $a$ and adapted to be secured thereto by means of the set-screw $g$, the said collar being provided with a leg or rest K and with a sprocket-wheel H, and a sprocket-chain I, connecting the sprocket-wheel H with the sprocket-wheel upon the reel-spindle, substantially as and for the purpose set forth.

2. In a wire-reel, the combination, with the carriage and the reel, of a reel-winding mechanism, the same consisting of a collar G, adjustable along the pole $a$ and provided with means for being secured thereto at any position, the said collar being provided with a sprocket-wheel fast upon a shaft which has upon its other end a crank-handle, and the said collar having secured to it on its under side a leg or rest K, substantially as and for the purpose set forth.

In testimony that I claim the foregoing as my own I have hereto affixed my signature in presence of two witnesses.

SOLOMON TRUMPY.

Witnesses:
  V. R. WADDEN,
  M. F. BAST.